United States Patent
DiFrancesco et al.

(10) Patent No.: US 10,731,497 B2
(45) Date of Patent: Aug. 4, 2020

(54) SEPARATE SECONDARY SEAL SUPPORT RAIL FOR SEAL

(71) Applicant: United Technologies Corporation, Farmington, CT (US)

(72) Inventors: Michael L. DiFrancesco, Waterbury, CT (US); Conway Chuong, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 88 days.

(21) Appl. No.: 15/890,590

(22) Filed: Feb. 7, 2018

(65) Prior Publication Data

US 2019/0242266 A1 Aug. 8, 2019

(51) Int. Cl.
*F01D 11/02* (2006.01)
*F16J 15/00* (2006.01)
*F01D 11/16* (2006.01)
*F16J 15/44* (2006.01)

(52) U.S. Cl.
CPC ............ *F01D 11/025* (2013.01); *F01D 11/16* (2013.01); *F16J 15/002* (2013.01); *F16J 15/442* (2013.01); *F05D 2220/323* (2013.01); *F05D 2240/55* (2013.01); *F05D 2260/38* (2013.01)

(58) Field of Classification Search
CPC .......... F16J 15/442; F16J 15/441; F01D 5/02; F01D 9/02; F01D 11/025; F01D 11/12; F05B 2240/57
See application file for complete search history.

(56) References Cited

U.S. PATENT DOCUMENTS

| | | | | |
|---|---|---|---|---|
| 4,017,088 A * | 4/1977 | Lerjen | ................... | F16J 15/441 277/416 |
| 7,410,173 B2 * | 8/2008 | Justak | ................... | F01D 11/00 277/355 |
| 7,896,352 B2 * | 3/2011 | Justak | ................... | F16J 15/442 277/411 |
| 8,002,285 B2 * | 8/2011 | Justak | ................... | F01D 11/02 277/412 |
| 8,172,232 B2 * | 5/2012 | Justak | ................... | F16J 15/442 277/411 |
| 8,641,045 B2 * | 2/2014 | Justak | ................... | F16J 15/442 277/412 |
| 8,919,781 B2 * | 12/2014 | Justak | ................... | F01D 11/025 277/411 |
| 9,045,994 B2 * | 6/2015 | Bidkar | ................... | F01D 11/02 |
| 9,115,810 B2 * | 8/2015 | Bidkar | ................... | F16J 15/447 |
| 9,587,746 B2 * | 3/2017 | Bidkar | ................... | F01D 11/025 |
| 10,030,531 B2 * | 7/2018 | Peters | ................... | F01D 11/025 |

(Continued)

OTHER PUBLICATIONS

The Extended European Search Report for EP Application No. 19155804.8, dated Jun. 13, 2019.

*Primary Examiner* — Eugene G Byrd
(74) *Attorney, Agent, or Firm* — Carlson, Gaskey & Olds, P.C.

(57) ABSTRACT

A hydrostatic seal assembly for a gas turbine engine includes a shoe movable radially relative to a longitudinal engine axis. At least one beam supports radial movement of the shoe. A secondary seal is fixed relative to the shoe. A rail is attached to the shoe and in sealing engagement with the secondary seal. A gas turbine engine and a method of creating a seal with a hydrostatic seal are also disclosed.

16 Claims, 6 Drawing Sheets

(56) References Cited

U.S. PATENT DOCUMENTS

| | | | |
|---|---|---|---|
| 2003/0080513 A1* | 5/2003 | Kirby, III | F16J 15/441 |
| | | | 277/416 |
| 2014/0008871 A1* | 1/2014 | Bidkar | F16J 15/447 |
| | | | 277/303 |
| 2014/0117624 A1 | 5/2014 | Bidkar et al. | |
| 2015/0322816 A1 | 11/2015 | Schmitz | |
| 2016/0069269 A1 | 3/2016 | Hyland et al. | |
| 2017/0051631 A1 | 2/2017 | Ackermann et al. | |
| 2018/0058240 A1* | 3/2018 | Chuong | F01D 5/02 |
| 2018/0372229 A1 | 12/2018 | Bidkar et al. | |

\* cited by examiner

SEPARATE SECONDARY SEAL SUPPORT RAIL FOR SEAL

STATEMENT REGARDING FEDERALLY SPONSORED RESEARCH OR DEVELOPMENT

This invention was made with government support under Contract No.: FA8626-16-C-2139 awarded by the United States Air Force. The government has certain rights in the invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Exhaust gas flow within the compressor and turbine sections is confined within a gas flow path with a small gap between fixed and rotating parts. A radially movable hydrostatic low leakage seal positioned between relative moving parts may be provided to adjust and maintain the desired gap dependent on engine operating conditions. A fixed secondary seal is provided relative to the moving hydrostatic low leakage seal. The structure and mass of the hydrostatic low leakage seal is adapted to compensate for wear and friction at an interface with the secondary seal.

Turbine engine manufacturers continue to seek improvements to engine performance including increased durability and improved thermal, transfer and propulsive efficiencies.

SUMMARY

A hydrostatic seal assembly for a gas turbine engine according to an exemplary embodiment of this disclosure, among other possible things includes a shoe movable radially relative to a longitudinal engine axis. At least one beam supports radial movement of the shoe. A secondary seal is fixed relative to the shoe. A rail is attached to the shoe and in sealing engagement with the secondary seal.

In a further embodiment of the foregoing hydrostatic seal assembly, the shoe includes a first radial height and the rail includes a second radial height that is larger than the first radial height.

In a further embodiment of any of the foregoing hydrostatic seal assemblies, the rail extends to a radial height that is greater than a radial height of the at least one beam.

In a further embodiment of any of the foregoing hydrostatic seal assemblies, the shoe includes a notch that receives the rail.

In a further embodiment of any of the foregoing hydrostatic seal assemblies, a fastener locates the rail on the shoe.

In a further embodiment of any of the foregoing hydrostatic seal assemblies, the shoe and rail are corresponding circumferential segments disposed about the longitudinal engine axis.

In a further embodiment of any of the foregoing hydrostatic seal assemblies, the rail includes a material different than the shoe.

In a further embodiment of any of the foregoing hydrostatic seal assemblies, the shoe includes a first side facing a higher pressure region and a second side facing a lower pressure region and the rail is disposed on the first side.

In a further embodiment of any of the foregoing hydrostatic seal assemblies, a plurality of shoes is disposed on a corresponding plurality of beams disposed in circumferential segments about the engine longitudinal axis and a corresponding plurality of rails disposed on each of the plurality of shoes.

A gas turbine engine according to an exemplary embodiment of this disclosure, among other possible things includes a stator. A rotor is rotatable within the stator and defines a circumferential gap therebetween. A hydrostatic steal is within the circumferential gap a plurality of radially movable shoes. A secondary seal is fixed relative to the shoe. A rail is attached to the shoe and is in sealing engagement with the secondary seal.

In a further embodiment of the foregoing gas turbine engine, the shoe includes a first radial height and the rail includes a second radial height that is larger than the first radial height.

In a further embodiment of any of the foregoing gas turbine engines, the rail includes a notch that receives the rail.

In a further embodiment of any of the foregoing gas turbine engines, the shoe and rail are corresponding circumferential segments disposed within the circumferential gap.

In a further embodiment of any of the foregoing gas turbine engines, at least beam supports radial movement of the shoe.

In a further embodiment of any of the foregoing gas turbine engines, the rail includes a material different than the shoe.

In a further embodiment of any of the foregoing gas turbine engines, the shoe includes a first side facing a higher pressure region and a second side facing a lower pressure region and the rail is disposed on the first side of the shoe.

A method of creating a seal with a hydrostatic seal according to an exemplary embodiment of this disclosure, among other possible things includes positioning a rail on a radially movable shoe disposed within a circumferential gap between a stator and a rotor. The rail abuts against a secondary seal fixed to the stator.

In a further embodiment of the foregoing method, positioning the rail is positioned on a front axial side of the rail facing a higher pressure region.

In a further embodiment of any of the foregoing methods, the rail is positioned relative to the rail with a fastener.

In a further embodiment of any of the foregoing methods, the rail is provided as a material different than the shoe.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
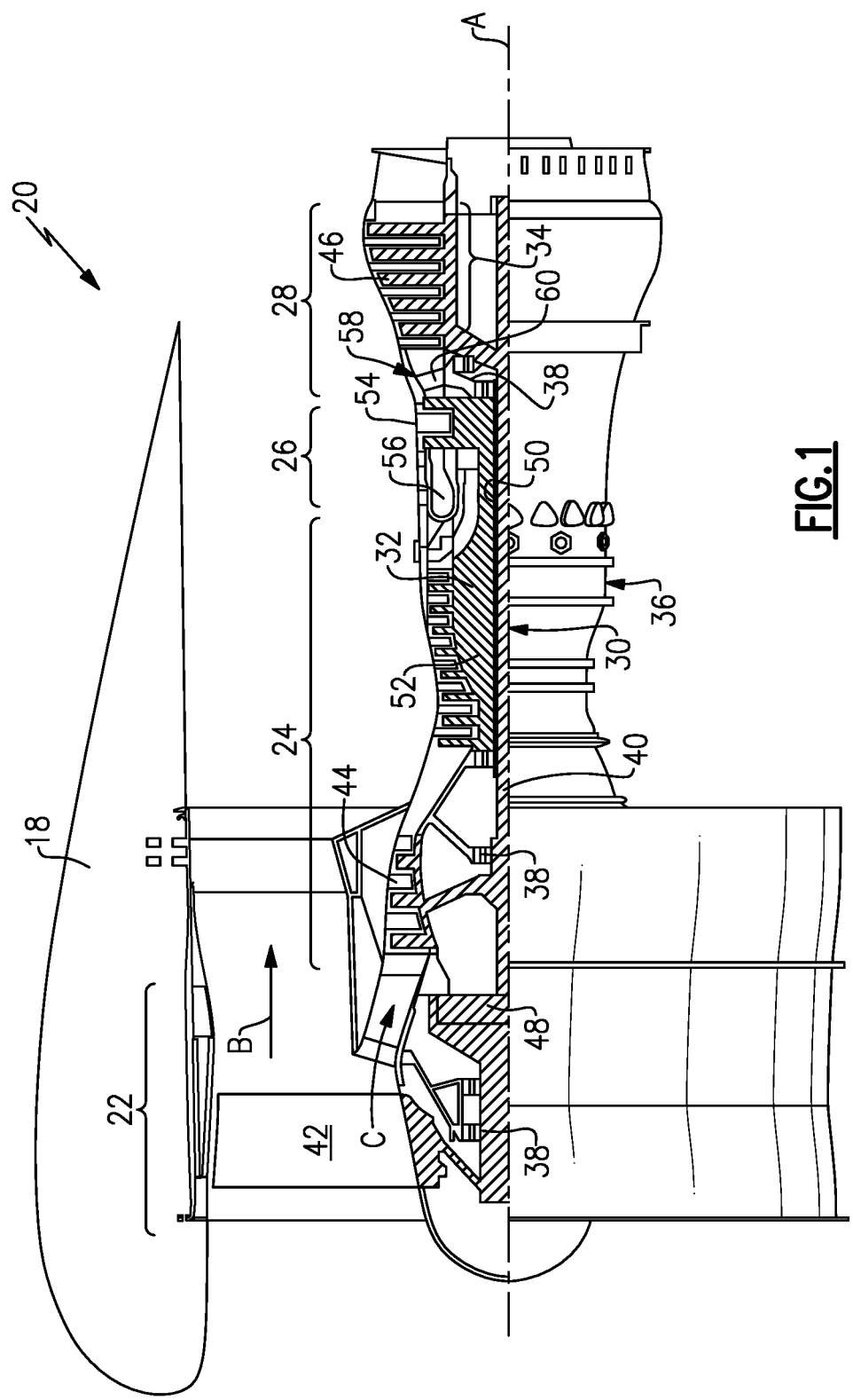
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 is disposed within a nacelle 18 and drives air along a bypass flow path B while the compressor section 24 draws air in along a core flow path C where air is compressed and communicated to a combustor section 26. In the combustor section 26, air is mixed with fuel and ignited to generate a high energy exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
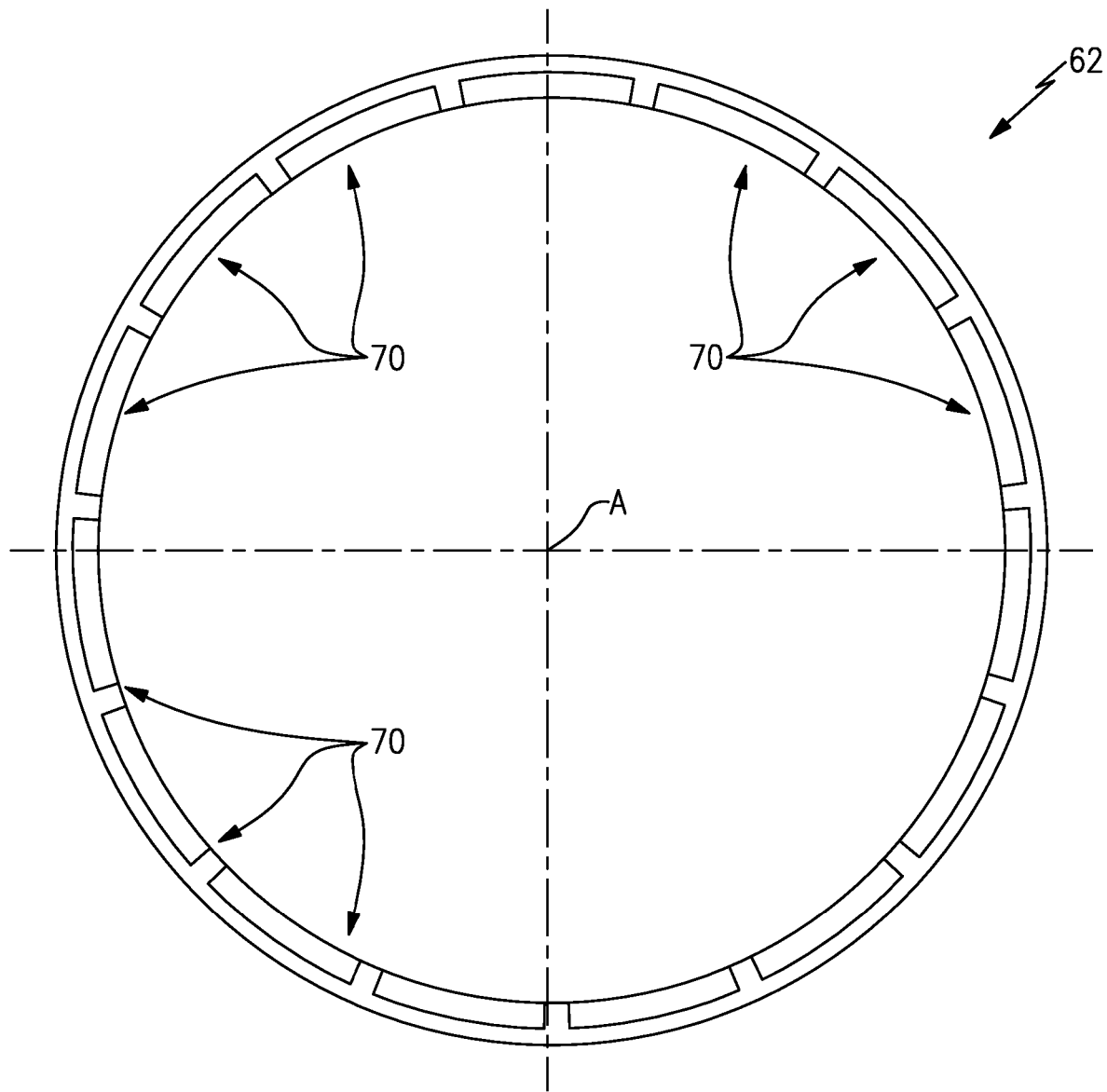
FIG. 2 is a front view of an example hydrostatic seal.
Figure 3:
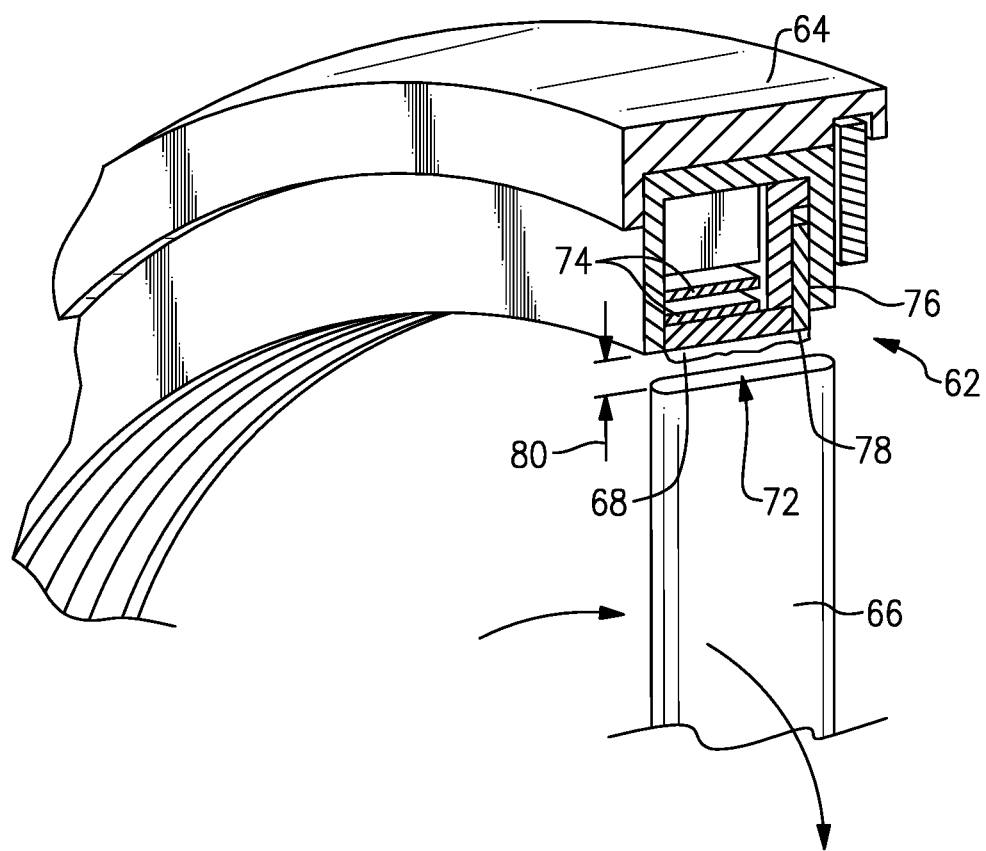
FIG. 3 is a sectional view of the example hydrostatic seal.

Referring to FIGS. 2 and 3 with continued reference to FIG. 1, the engine 20 includes a number of rotating rotors in the turbine and compressor sections that rotate relative to a fixed case or stator. A gap 80 between the rotating parts and the fixed stator is provided to enable rotation. The gap 80 is minimized to avoid leakage around the rotating parts to improve engine operating efficiency. A hydrostatic seal 62 is provided to maintain and automatically adjust the gap 80 between the rotating part that in one disclosed example is a rotor blade 66 and a stator 64. The hydrostatic seal 62 includes a plurality of circumferential segments 70 disposed about the engine longitudinal axis A.

Figure 4:
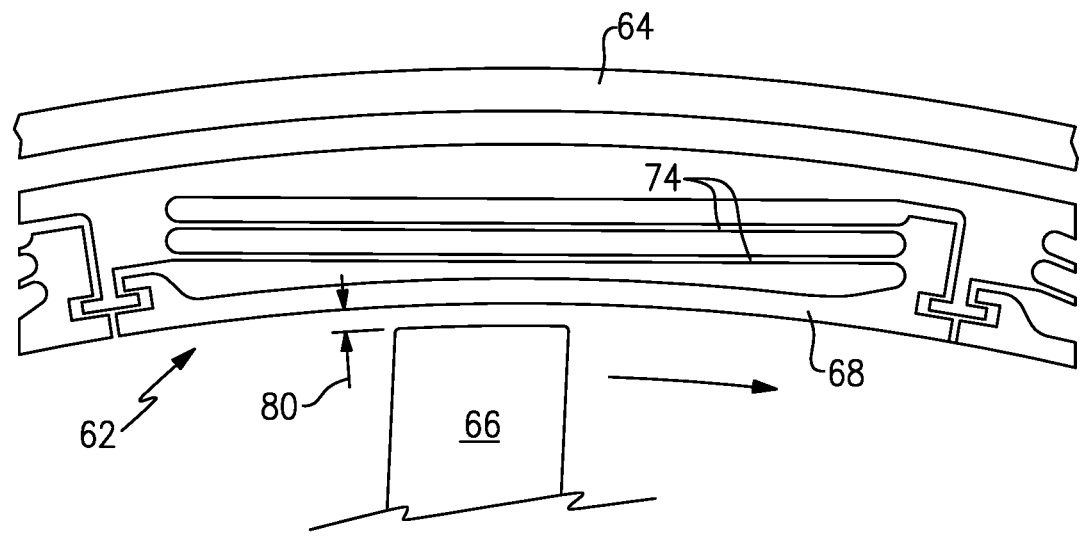
FIG. 4 is a cross-sectional view of a portion of the example hydrostatic seal.
Figure 6:
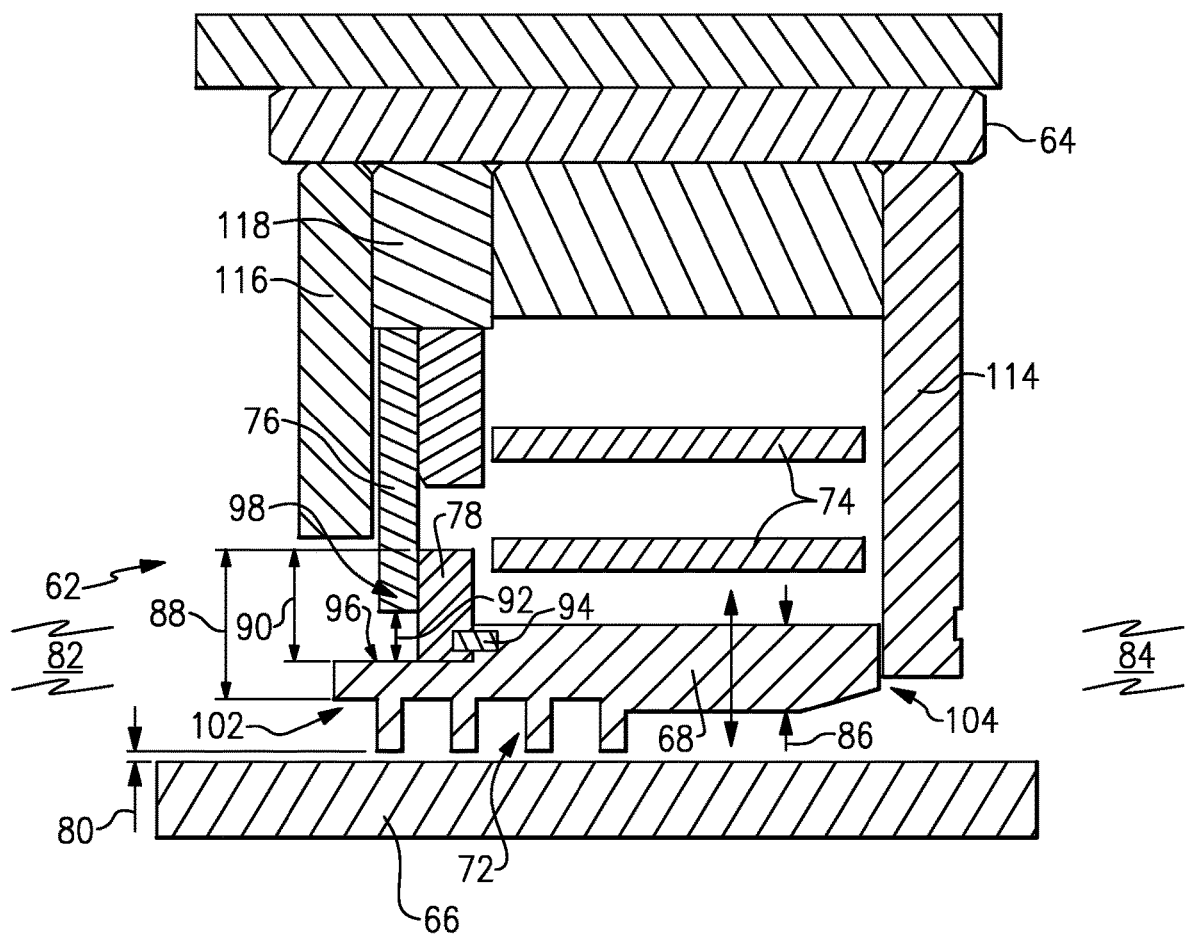
FIG. 6 is a cross-section of an example hydrostatic seal.

Referring to FIG. 4 with continued reference to FIGS. 2 and 3, the example hydrostatic seal 62 includes a shoe 68 that is radially supported on beams 74. The shoe 68 is movable radially and contained axially by a scalloped plate 114 (FIG. 6). The beams 74 allow radial movement of the shoes 68 to adjust the circumferential gap 80 relative to the rotating rotor 66. The shoe 68 includes teeth 72 disposed circumferentially for modifying a pressure field within the gap 80. Changes to the pressure field within the gap 80 cause radial movement of the shoe 68 to change the gap 80 to adapt to engine operating conditions.

The shoe 68 may be driven to oscillate at a frequency similar to that of the rotor speed. In order to prevent premature HCF failure of the seal system, the seal natural frequency is increased to prevent coincidence from occurring. A reduction in mass of the shoe 68 provides an increase in the natural frequency.

Figure 5:
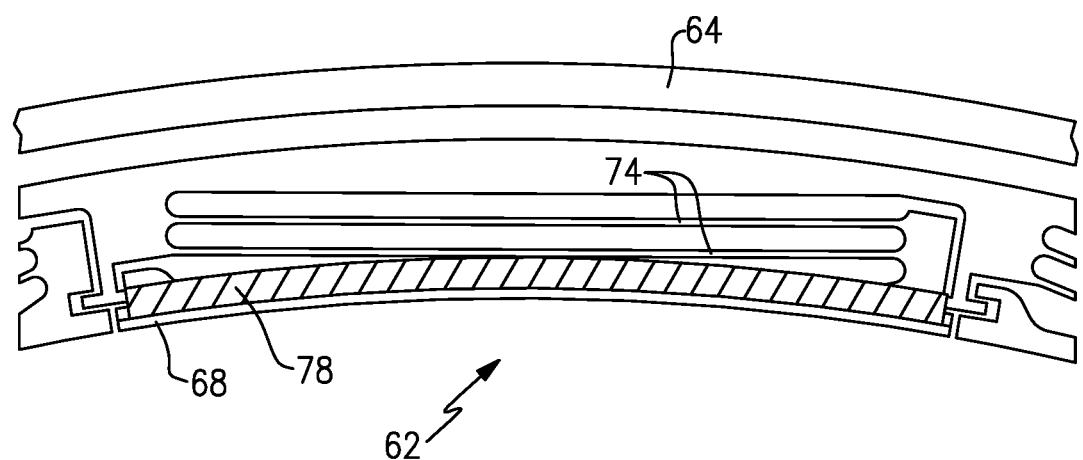
FIG. 5 is a front view of a portion of an example hydrostatic seal.

Referring to FIGS. 5 and 6, a secondary seal 76 is provided between the radially movable shoe 68 and the stator structure 64. The secondary seal 76 is supported on a spacer 118 that orientates the secondary seal 118 radially relative to the shoe 68. A seal cover 116 and the spacer 118 hold the secondary seal 76 axially. The interface between the shoe 68 and the secondary seal 76 requires additional structure to provide the necessary support for the secondary seal 76 along with a sufficient amount of sealing and wear surface. The additional structure required to provide the seal and wear surface with enough surface area to accommodate the entire travel range of the shoe 68 including some extra material to accommodate manufacturing variances results in an increased overall mass of the shoe 68 that in turn can reduce the natural frequency. The disclosed example shoe 68 includes a separate rail 78 that defines the interface with the secondary seal 76 thereby enabling a reduction in mass and increased natural frequency of the seal system.

The rail 78 is in sealing engagement with the secondary seal 76. The shoe 68 includes a first side 102 facing forward and toward a higher pressure region 82. A second side 104 faces aft toward a lower pressure region 84. The rail 78 is supported on the first side 102 of the shoe 68 facing toward the higher pressure region 82. The plurality of teeth 72 within the radial circumferential gap 80 modify the pressure field within gap 80 to continually adjust the radial position of the shoe 68 relative to the rotor 66.

The shoe 68 oscillates radially at a frequency corresponding with the rotor speed, due to the pressure differential between the higher pressure and lower pressure regions 82, 84. The rail 78 provides a support surface 98 with the secondary seals 76 and thereby enables the mass and structure of the shoe 68 to be reduced. Moreover, the rail 78 may be formed from a material different than the shoe 68 that reduces friction that can impede the rate of radial movement or stop movement altogether. Additionally, the different material can reduce wear to increase the operational life of the seal assembly 62.

In the disclosed example embodiment, a notch 96 is formed in the shoe 68 for the rail 78. The rail 78 includes a radial height 90 that extends radially outward from the shoe 68. The radial height 90 of the rail 78 corresponds with the range of radial movement of the shoe 68 such that the rail 78 will be in sealing engagement with the secondary seal 76 at the extreme limits of radial movement. A gap 92 is provide between the secondary seal 76 and the shoe 68 that corresponds with the limits of radial movement.

A combined radial height 88 of the shoe 68 and the shoe 68 in the notch portion is larger than a radial height 86 of the shoe 68 near the second end 104. The reduced radial height reduces the overall mass of the shoe 68 thereby enabling an increased natural frequency to protect the seal 62 from premature HCF failure. Additionally, the reduced radial height greatly reduces the size of the shoe 68 because the beams 74 can be made much closer radially to the shoe 68 with currently available manufacturing techniques. The reduced height aids in packaging that in turn enables use in areas not otherwise practical with the travel distance required.

Figure 7:
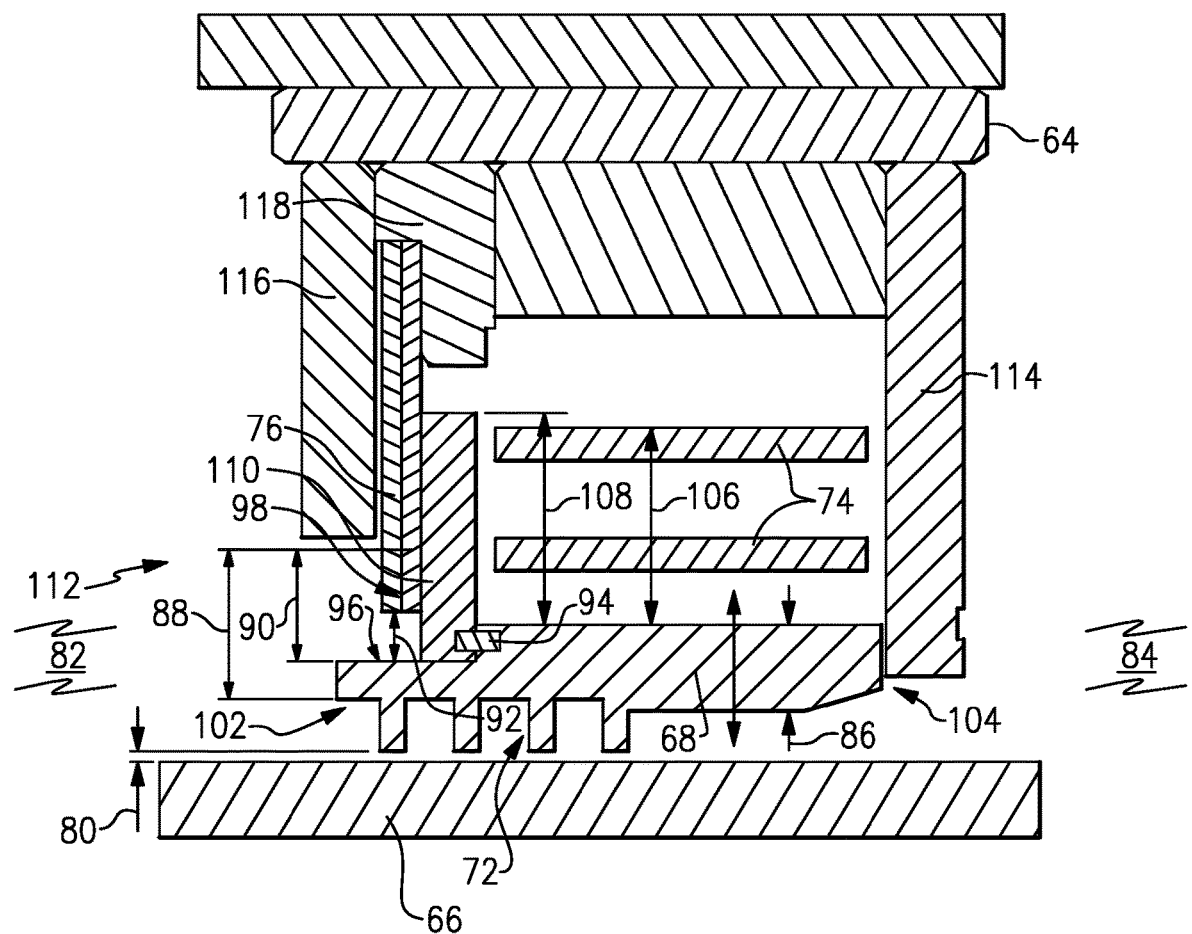
FIG. 7 is a cross-section of another example hydrostatic seal embodiment.

Referring to FIG. 7, another example seal assembly 112 is shown and includes a rail 110 that extends to a radial height 108 that is greater than a radial height 106 of the top most beam 74. The increased height 108 to which the rail 110 extends enables for an increased deflection capability over structures that do not include a separate rail 110. This type of architecture would not be achievable using conventional manufacturing techniques that require line-of-sight access, including but not limited to wire-EDM, laser, and water-jet machining.

Referring to FIG. 6 with continued reference to FIG. 7, the rail 78 is supported on the first side 96 of the shoe 68 within the notch 96 and secured in place by a positioning pin 94. Differentials in pressure maintain the rail 78 in a desired position. Although a pin 94 is shown any fastener could be utilized to secure the rail 78 to the shoe 68.

Each of the shoes 68 is a circumferential segment disposed about the engine longitudinal axis A. Accordingly, each of the rails 78 is a corresponding circumferential segment that is attached to the front side 102 of the shoe 68. The front side 102 of the shoe 68 is exposed to the high pressure region 82.

Because the rail 78 provides the sealing and support surface 98 instead of the shoe 68, the shoe 68 may be made of a reduced radial height 86 and thereby a reduced overall mass of the shoe 68. The reduced mass increases the seal system natural frequency that protects against premature HCF failure due to rotor coincidence. Moreover, the rail 78 is removable from the shoe 68 as it wears and may be replaced instead of replacing the entire seal assembly 62. Additionally, because the shoe 68 is of a reduced radial height, the entire radial height of the hydrostatic seal assembly 62 can be reduced thereby reducing the required space needed.

Accordingly, the example hydrostatic seal assembly 62 includes a lighter shoe 68 and a rail 78 that provides the improved wear and sealing contact with secondary seals 76.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A hydrostatic seal assembly for a gas turbine engine comprising:
   a shoe movable radially relative to a longitudinal engine axis, the shoe including a notch;
   at least one beam supporting radial movement of the shoe;
   a secondary seal fixed relative to the shoe; and
   a rail received within the notch, attached to the shoe and in sealing engagement with the secondary seal, wherein the shoe includes a first radial height and the rail includes a second radial height that is larger than the first radial height.

2. The hydrostatic seal assembly as recited in claim 1, wherein the rail extends to a radial height that is greater than a radial height of the at least one beam.

3. A hydrostatic seal assembly for a gas turbine engine comprising:
   a shoe movable radially relative to a longitudinal engine axis;
   at least one beam supporting radial movement of the shoe;
   a secondary seal fixed relative to the shoe;
   a rail attached to the shoe and in sealing engagement with the secondary seal; and a fastener for locating the rail on the shoe.

4. The hydrostatic seal assembly as recited in claim 1, wherein the shoe and rail are corresponding circumferential segments disposed about the longitudinal engine axis.

5. The hydrostatic steal assembly as recited in claim 1, wherein the rail comprises a material different than the shoe.

6. The hydrostatic steal assembly as recited in claim 1, wherein the shoe includes a first side facing a higher pressure region and a second side facing a lower pressure region and the rail is disposed on the first side.

7. The hydrostatic steal assembly as recited in claim 1, including a plurality of shoes disposed on a corresponding plurality of beams disposed in circumferential segments about the engine longitudinal axis and a corresponding plurality of rails disposed on each of the plurality of shoes.

8. A gas turbine engine comprising:
   a stator;
   a rotor rotatable within the stator and defining a circumferential gap therebetween;
   a hydrostatic steal within the circumferential gap a plurality of radially movable shoes, wherein one of the plurality of radially movable shoes including a notch;
   a secondary seal fixed relative to the shoe; and
   a rail received within the notch, attached to the shoe and in sealing engagement with the secondary seal, wherein the shoe includes a first radial height and the rail includes a second radial height that is larger than the first radial height.

9. The gas turbine engine as recited in claim 8, wherein the shoe and rail are corresponding circumferential segments disposed within the circumferential gap.

10. The gas turbine engine as recited in claim 8, including at least beam supporting radial movement of the shoe.

11. The gas turbine engine as recited in claim 8, wherein the rail comprises a material different than the shoe.

12. The gas turbine engine as recited in claim 8, wherein the shoe includes a first side facing a higher pressure region and a second side facing a lower pressure region and the rail is disposed on the first side of the shoe.

13. A method of creating a seal with a hydrostatic seal comprising:
    positioning a rail within a notch on a radially movable shoe disposed within a circumferential gap between a stator and a rotor; and
    abutting the rail against a secondary seal fixed to the stator such that the shoe includes a first radial height and the rail includes a second radial height that is larger than the first radial height.

14. The method as recited in claim 13, including positioning the rail on a front axial side of the rail facing a higher pressure region.

15. The method as recited in claim 13, including positioning the rail relative to the rail with a fastener.

16. The method as recited in claim 13, including providing the rail as a material different than the shoe.

* * * * *